Jan. 19, 1960  A. LUTHI  2,921,397
FISH LANDING NET
Filed Feb. 6, 1959  2 Sheets-Sheet 1

INVENTOR.
ALFRED LUTHI
BY Robert K. Yantie
ATTORNEY.

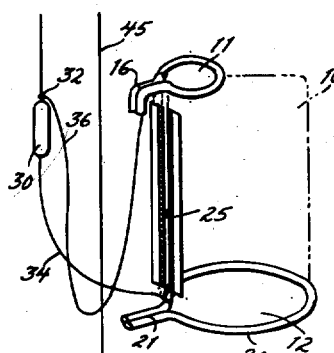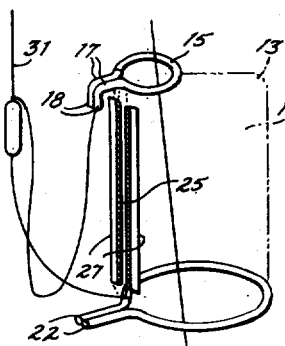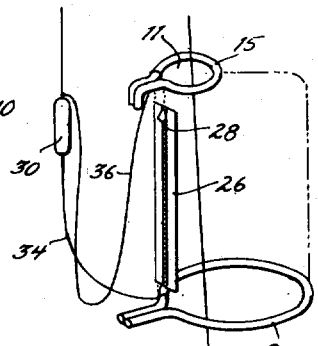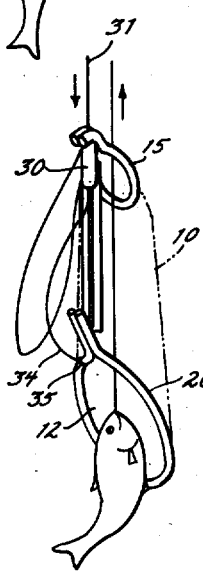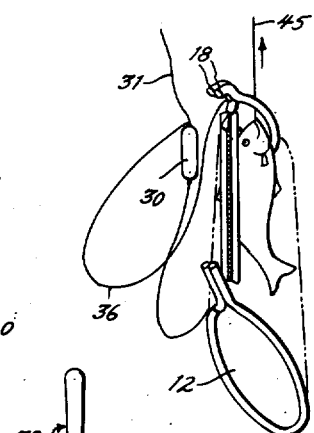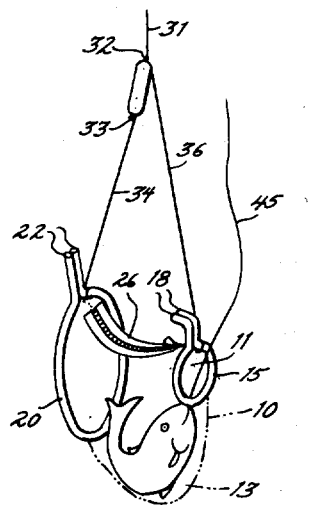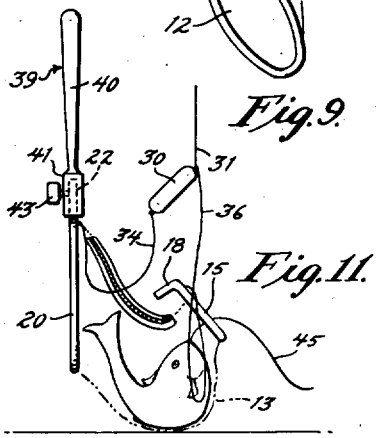

United States Patent Office 2,921,397
Patented Jan. 19, 1960

2,921,397
FISH LANDING NET

Alfred Luthi, Philadelphia, Pa., assignor of thirty percent to Michael Calise, Philadelphia, Pa.

Application February 6, 1959, Serial No. 791,563

7 Claims. (Cl. 43—7)

This invention relates generally to fishing devices, and is especially concerned with a device for landing a hooked fish.

As is well known to those versed in the art, the landing of a hooked fish is usually a difficult procedure, requiring considerable skill and sometimes involving a considerable element of danger. Also, even very experienced fishermen occasionally lose a fish in the landing operation. While several fish landing devices have been proposed in the past, such devices have been subject to numerous disadvantages, such as being unduly expensive to manufacture, difficult to operate, and being unreliable in use.

Accordingly, it is an object of the present invention to provide a fish landing device which overcomes the above mentioned difficulties, is extremely simple and entirely reliable in use, and which is capable of operation by unskilled persons to insure the quick and easy landing of a hooked fish.

It is a further object of the present invention to provide a fish landing device having the advantageous characteristics mentioned in the preceding paragraph which is simple and durable in construction, long lasting in use, and which can be economically manufactured for sale at a reasonable price.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

Figures 5–11 are somewhat diagrammatic illustrations showing the fish landing device of Figure 1 in successive stages of its operative condition of use.

Figure 1:
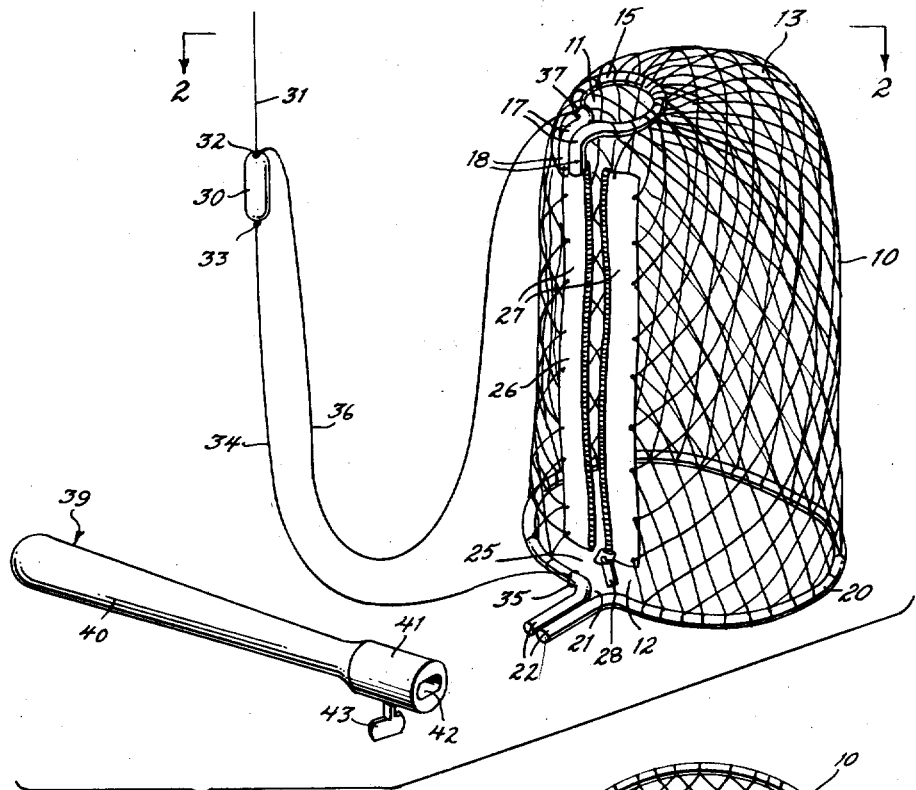
Figure 1 is a perspective view illustrating a fish landing device constructed according to the teachings of the present invention, in the condition preparatory to use.
Figures 2, 3, 4:
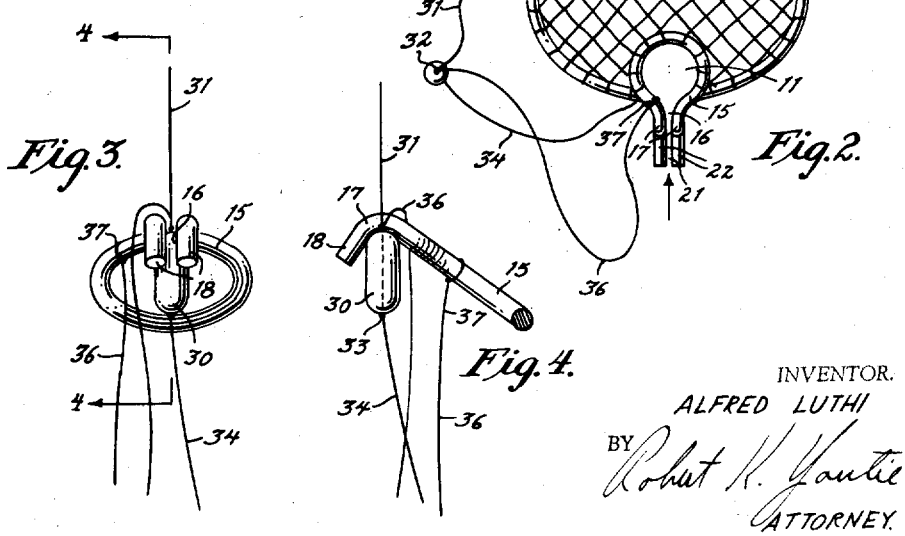
Figure 2 is a top view showing the fish landing device of Figure 1 taken substantially along the line 2—2 thereof.
Figure 3 is a front view showing an upper ring element of the device of Figure 1 and a supporting body in operative association with the ring element, with the net of Figure 1 removed for clarity of illustration.
Figure 4 is a sectional view taken substantially along the line 4—4 of Figure 3.

Referring now more particularly to the drawings, and specifically to Figures 1 and 2 thereof, the fish landing device illustrated therein may include a net 10 fabricated of any suitably flexible netting material and having a pair of spaced openings 11 and 12. As illustrated, the net 10 is vertically elongate, the opening 11 being relatively small and located at the upper end of the net, while the opening 12 is relatively large and located at the lower end of the net. The net 10 may be of any suitable configuration, say that of the frustum of a cone, and is illustrated as being of a generally cylindrical or rectangular configuration with the lower, larger opening 12 encompassing the entire lower net end, and the upper, smaller opening 11 being located at one corner of the upper end of the net, with the other upper end corner 13 of the net defining a pocket.

Secured to the net 10, extending about the boundary of the upper, smaller net opening 11, is a rigid annulus or ring 15. The annulus 15 may be bent from rod stock, or otherwise formed, with its ends adjacent to but spaced from each other to define a passageway or split 16 in the ring 15. It may be observed that the split or passageway 16 in the ring 15 opens outward from the latter in the direction away from the other upper end corner or pouch region 13. Projecting from respective ends of the split ring 15, so as to lie on opposite sides of the passageway or split 16, are a pair of extensions 17. The extensions 17 project in substantially parallel spaced relation with respect to each other, generally radially from the ring 15 outward away from the pouch region 13 of the net, and may have their face free ends or terminal portions 18 bent substantially normal to the plane of the ring, extending generally downward or toward the larger net end opening 12. That is, the terminal end portions 18 of the extension 17 extend in substantial parallel, spaced relation with respect to each other toward the opposite net end, so that the extensions operatively define a catch, as will appear hereinafter in greater detail.

Extending about the boundary of the lower, larger net opening 12, and secured thereabout to the net, is a relatively large annulus or ring 20, which may be bent of rod stock, or otherwise formed, with its ends adjacent to but spaced from each other to define therebetween a passageway or opening 21. The opening or split 21 of the larger ring 20 is located in substantial alignment with the split 16 of the upper, smaller ring 15, vertically or longitudinally of the net 10. Projecting generally radially outward from the lower, larger ring 20, on opposite sides of the split 21, are a pair of spaced, substantially parallel extensions 22 for connection to a handle, as will appear presently.

The net 10 is formed longitudinally thereof with an opening 25 extending the entire length of the net between the smaller and larger net openings 11 and 12, in substantial alignment with the extensions 17 and 22 of the smaller and larger rings 15 and 20, respectively. Further, the longitudinal net opening 25 communicates at its opposite ends through the splits 16 and 21, respectively, of the smaller and larger rings 15 and 20 with the openings 11 and 12. Provided in the elongate, longitudinally extending net opening 25 is a separable fastener 26, which may be of the slide type having a pair of tapes 27 and a slider 28. As illustrated in Figure 1, the tapes 27 may extend in substantial parallelism, longitudinally of the net 10 between and terminating at their opposite ends adjacent to the respective rings 15 and 20, each tape being stitched or otherwise being secured along one longitudinal margin of the net opening 25. Thus, the longitudinal net opening 25 is selectively openable and closable by operation of the slide fastener 26 in the conventional manner.

A support body or pin 30 is preferably of elongate, ovaloid or generally cylindrical configuration having rounded ends so as to be exteriorly smooth. The support body or pin 30 may be provided with an axial through opening for receiving a flexible line or cord 31 extending through and beyond opposite ends of the support body. Suitable stop means, such as knots 32 and 33 may be provided in the flexible line or cord 31 exteriorly of and adjacent to opposite ends of the support body to locate the latter at a desired position on the line. One end of the line or cord 31, the upper end as seen in Figure 1, may be wound in a supply roll (not shown), or otherwise conveniently retained, while the lower end portion 34 of the cord 31 is connected, as at 35 to the larger ring 20 adjacent to one of the extensions 22. An additional flexible cord or line 36 is connected at one end to the support body 30, as by the stop member or knot 32, and is connected at its other end 37 to the upper, smaller ring 15 adjacent to one of the extensions 17. The flexible cord 34 between the support body 30 and larger ring 20 is preferably slightly shorter than the flexible cord 36 between the support body and smaller ring 15, for purposes appearing presently.

A handle is generally designated 39 in Figure 1, including a hand grip portion 40, and a socket portion 41 on one end of and opening outward from the grip portion. The socket portion 41 is provided with a recess or hole 42 adapted to receive the extensions 22, and a set screw 43, or other suitable locking means, is provided on the socket portion 41 to releasably anchor the extensions in the socket hole.

In the condition of Figure 3, the support body 30 has been engaged beneath the catch means or extensions 17 with the line 31 extending upward from the support body through the split 16. As the support body 30 is of greater width than the split or opening 16 of the smaller ring 15, it is caught beneath the extensions 17, and may in this condition support the fish landing device with the smaller ring uppermost and larger ring lowermost. This condition is also seen in Figure 4, the net being omitted from both Figures 3 and 4 for ease of understanding.

The sequence of steps in using the instant fish landing device is illustrated in Figures 5–11. With a fish hooked on a fishing line 45, see Figure 5, the slide fastener 26 is completely opened and the fishing line is passed laterally through the upper and lower splits or slots 16 and 21 of the rings, and through the longitudinal net opening 25 between the separable parts of the fastener 26. This condition is illustrated in Figure 6, wherein the fishing line 45 extends entirely through the net 10 and outward therefrom through the rings 15 and 20.

The separable fastener 26 is then closed, as in Figure 7, so that the landing device is circumposed about the fishing line 45.

The support body 30 is then engaged or caught beneath the extensions or catch means 17, with the cord 31 extending upward from the support body through the split 16 of the smaller ring 15. In this condition, the cord 31 may be extended to lower the net along the fishing line 45, and the latter may be simultaneously drawn upward, as indicated in Figure 8. It will there be seen that the fish landing device is supported by support body 30 with the smaller ring 15 uppermost and the larger ring 20 lowermost.

As the fish line 45 moves upward relative to the net 10, the fish enters upward into the net through the lower, larger ring 20 and engages with the upper, smaller ring 15. The larger ring is of a size to freely pass the fish, while the smaller ring is of a size incapable of passing the fish. Upon upward movement of the fish into engagement with the upper, smaller ring 15, the latter is raised to disengage the catch 17 from its supported engagement with the support body 30, as illustrated in Figure 9. The fishing line 45 may then be slackened, see Figure 10, and the weight of the landing device and fish contained therein taken by the cord 31 through the cords 34 and 36. It will be noted that the cords 34 and 36 are of such relative length that the larger, previously lower ring 20 is elevated when the landing device is supported by these cords, to a position wherein the fish cannot escape or fall out. Further, the pocket region 13 of the net 10, being remote from the extensions 17 and 22, which are uppermost in this condition, is on the underside and defines a snug receptacle for the fish.

In this condition, the landing device may be quickly and easily elevated to within reach of the user, and the handle 39 applied to the larger ring 20, by insertion of the extensions 22 into the socket 41, to facilitate manipulation of the landing device and contained fish. This is illustrated in Figure 11. From this point, it is obvious that the fish may be readily removed from the landing device with no difficulty.

From the foregoing, it is seen that the present invention provides a fish landing device which fully accomplishes its intended objects, and is well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. A fish landing device comprising a net having spaced larger and smaller openings, a pair of larger and smaller split rings respectively secured about the larger and smaller openings of said net, a separable fastener provided in said net extending between the splits of said rings for selectively opening and closing the net in a region communicating through the splits of said rings with said net openings, catch means on said smaller ring exteriorly of said net and facing toward said larger ring, a support body releasably interengaged with said catch means and adapted to be suspended by a flexible line for supporting said net and rings with the smaller ring uppermost, said catch being disengageable from said supporting body upon upward movement of a fish in said net against the smaller upper ring, and a flexible cord connected between said support body and the larger ring for elevating the latter relative to the smaller ring upon said disengagement of said catch and support body.

2. A fish landing device according to claim 1, said catch means comprising a pair of spaced extensions projecting generally radially outward from said smaller ring on opposite sides of the split thereof and having their free ends extending toward said larger ring, whereby said support body is engageable beneath said extensions with said flexible line passing upward between said extensions to suspend said net with said smaller ring uppermost.

3. A fish landing device according to claim 1, in combination with at least one extension projecting outward from said larger ring, and a handle detachably secured to said extension for manipulating said net.

4. A fish landing device according to claim 1, said separable fastener comprising a slide fastener extending between and having its opposite ends terminating contiguous to the splits of respective rings.

5. A fish landing device according to claim 1, in combination with a second flexible cord connected between said support body and the smaller of said rings, said first and second flexible cords being of such relative lengths whereby they are adapted to suspend said rings so that the relative elevations thereof prevent the escape of a fish from said net.

6. A fish landing device comprising a net having spaced larger and smaller openings, a pair of larger and smaller split rings respectively secured about the larger and smaller openings of said net, a slide fastener provided in said net extending between and having its opposite ends terminating contiguous to the splits of respective rings for selectively opening and closing the net in a region communicating through the split of said rings with said net openings, catch means on said smaller ring exteriorly of said net and facing toward said larger ring, a support body releasably interengageable with said catch means and adapted to be suspended by a flexible line for supporting said net and rings with the smaller ring uppermost, said catch being disengageable from said support body upon upward movement of a fish in said net against said smaller upper ring, and a pair of flexible cords connected between said support body and respective rings to suspend the latter at relative elevations preventing escape of a fish from said net.

7. A fish landing device according to claim 6, said catch means comprising a pair of spaced extensions projecting generally radially outward from said smaller ring on opposite sides of the split thereof and having their free ends extending toward said larger ring, whereby said support body is engageable beneath said extensions with said flexible line passing upward between said extensions to suspend said net with said smaller ring uppermost.

References Cited in the file of this patent

UNITED STATES PATENTS

| | | |
|---|---|---|
| 1,797,251 | Tyrrell | Mar. 24, 1931 |
| 2,782,546 | Edworthy | Feb. 26, 1957 |

FOREIGN PATENTS

| | | |
|---|---|---|
| 60,401 | Norway | Jan. 30, 1939 |